United States Patent
Sato et al.

(10) Patent No.: US 8,253,305 B2
(45) Date of Patent: Aug. 28, 2012

(54) DRIVE UNIT OF PRESSURE DEVICE

(75) Inventors: Yoshio Sato, Kanagawa-pref (JP);
Arinobu Mori, Kanagawa-pref (JP);
Tsuneaki Sudo, Kanagawa-pref (JP);
Shinichi Kurihara, Kanagawa-pref (JP)

(73) Assignee: Obara Group Incorporated, Yamato-shi, Kanagawa (JP)

( * ) Notice: Subject to any disclaimer, the term of this patent is extended or adjusted under 35 U.S.C. 154(b) by 294 days.

(21) Appl. No.: 12/801,296

(22) Filed: Jun. 2, 2010

(65) Prior Publication Data
US 2010/0301795 A1 Dec. 2, 2010

(30) Foreign Application Priority Data
Jun. 2, 2009 (JP) .................. 2009-132775

(51) Int. Cl.
*H02N 2/00* (2006.01)
(52) U.S. Cl. .................. 310/323.18; 310/328
(58) Field of Classification Search ............. 310/323.18, 310/328
See application file for complete search history.

(56) References Cited

U.S. PATENT DOCUMENTS

| | | | | |
|---|---|---|---|---|
| 3,384,284 A | * | 5/1968 | Obeda | ............. 228/1.1 |
| 4,865,162 A | | 9/1989 | Morris et al. | |
| 5,581,013 A | * | 12/1996 | Frederick | ............. 73/11.03 |
| 6,146,268 A | * | 11/2000 | Behnke et al. | ............. 460/4 |
| RE37,030 E | * | 1/2001 | Lloyd et al. | ............. 33/559 |
| 6,554,109 B1 | | 4/2003 | Olschewski et al. | |
| 6,911,615 B2 | | 6/2005 | Reischmann | |
| 7,145,097 B2 | | 12/2006 | Leach et al. | |
| 7,256,365 B2 | | 8/2007 | Platte et al. | |
| 7,533,557 B1 | * | 5/2009 | Mott et al. | ............. 73/12.14 |
| 2008/0272091 A1 | | 11/2008 | Sato | |
| 2010/0005639 A1 | | 1/2010 | Muller | |

FOREIGN PATENT DOCUMENTS

| | | |
|---|---|---|
| DE | 102004054836 A1 | 5/2006 |
| GB | 2223544 A | 4/1990 |
| JP | 2008043997 A | 2/2008 |

OTHER PUBLICATIONS

Extended European search report for corresponding European patent application No. 10164552.1, dated Oct. 6, 2010, 7 pages.

* cited by examiner

*Primary Examiner* — Thomas M Dougherty
(74) *Attorney, Agent, or Firm* — Bacon & Thomas, PLLC

(57) ABSTRACT

A drive unit of a pressure device, such as a welding gun, includes a piezoelectric type load cell adapted to be arranged in an easily attached and removed manner and to have relatively small capacity. The drive unit includes a through-hole 6, formed in a rotary shaft 5 of a drive motor 1, which is a drive source, and a pressure shaft 10, configured to be able to move with a part thereof being in the through-hole 6. The rotary shaft 5 is rotatably supported by the bearing 7, and the piezoelectric type load cell 17 is sandwiched between a preload striker plate 18, through which the pressure shaft 10 passes, and a preload setting striker plate 19, through which the pressure shaft 10 passes with a preload exerted on the load cell 17.

3 Claims, 4 Drawing Sheets

DRIVE UNIT OF PRESSURE DEVICE

BACKGROUND OF THE INVENTION

1. Field of the Invention

The present invention relates to a drive unit used for a pressure device, such as a spot welding gun, friction stir welding (FSW), and a press.

2. Description of the Related Art

Drive units used for pressure devices, such as a spot welding gun, FSW, and a press, have conventionally been configured to be severally provided with a through-hole formed in the rotary shaft of a motor, which is a drive source, a pressure shaft including a part to be drawn into the through-hole at the time of drive, and an incorporated piezoelectric type load cell, detecting a pressurization quantity. Among them, the drive unit having the structure disclosed in, for example, the following document is known: A. Kirchheim et al., Kistler Instrumente AG, Switzerland, "Manufacturing Force Measurement in Resistance Welding," Page 10 FIG. 13, [online], 19 DVS-Meeting "Resistance Welding" May 26-27, 2004 Duisburg, Germany, Retrieved from the Internet: <URL: http://www.kistler.com/mediaaccess/920-332e-07.07.pdf>.

Now, because the piezoelectric type load cell is arranged between an output shaft and a bearing in the drive unit of the pressure device mentioned above, the force operating on the piezoelectric type load cell changes to an increasing direction at the time of pressurization. Consequently, the piezoelectric type load cell has the problems, in which the capacity of the load cell is required to have a certain degree of magnitude and it is not easy to attach and remove the load cell.

BRIEF SUMMARY OF THE INVENTION

The present invention was made in view of the problems of the conventional technique, and aims at providing a drive unit of a pressure device enabling a piezoelectric type load cell in the drive unit to have relatively small capacity to make it easy to attach and remove the load cell from the drive unit.

In order to achieve the object mentioned above, a first aspect of the drive unit of the pressure device of the present invention is a drive unit of a pressure device including a drive source, having a rotary shaft, in which a through-hole is formed, and a pressure shaft, driven by the drive source and having a part to be drawn into the through-hole, wherein the rotary shaft is rotatably supported by a bearing; a preload striker plate and a preload setting striker plate are arranged in order before the bearing; a piezoelectric type load cell is arranged between both the striker plates; and the load cell is incorporated with a preload exerted thereon in order that an output of the piezoelectric type load cell decreases when the pressure shaft is making a pressing movement.

Furthermore, in a second aspect of the invention, the piezoelectric type load cell in the first aspect is arranged on a periphery of a shaft center in conjunction with a plurality of spacers, and the load cell is sandwiched between the preload striker plate and the preload setting striker plate to be incorporated with a preload exerted thereon.

In a third aspect of the invention, the pressure device is positioned to an outer fixed structure through the preload setting striker plate.

In the first aspect of the invention, the bearing is arranged in a front part of the rotary shaft; the piezoelectric type load cell is arranged on the front side of the preload striker plate in front of the bearing; and the piezoelectric type load cell is sandwiched between the preload striker plate and the preload setting striker plate to incorporate the piezoelectric type load cell with a preload exerted thereon, and consequently, when a pressurization force is produced on the pressure shaft, a force operates on the preload setting striker plate to become farther from the piezoelectric type load cell. Hereby, the set preload of the piezoelectric type load cell can be raised to the limit of the capacity of the piezoelectric type load cell, and further the possibility of damaging the load cell is little even when the pressurization force is abnormally great. Furthermore, because the piezoelectric type load cell is situated in front of the bearing, the attachment and the removal of the load cell can easily be performed, and also the connection of the communication cable to be attached to the piezoelectric type load cell can be performed very easily.

According to the second aspect of the invention, if the piezoelectric type load cell is arranged on the periphery of the shaft center in conjunction with the plurality of spacers to be sandwiched between the preload striker plate and the preload setting striker plate and the piezoelectric type load cell is incorporated with the preload exerted thereon, then the piezoelectric type load cell can freely be selected to be in a small size independent of the diameter of the pressure shaft, and the freedom of the selection brings about an inexpensive cost, in addition to the effect of the first aspect.

According to the third aspect of the invention, the pressure device is fastened to an outer fixed structure through the preload setting striker plate, and consequently a force separating the preload setting striker plate 19 from the piezoelectric type load cell 17 is exerted when a pressurization force is produced in the pressure shaft 10, in addition to the effects of the first and second aspects. Furthermore, the loss of the frictional force at the time of pressurization takes the minimum value, and it becomes possible to obtain a signal having a large signal-to-noise (S/N) ratio to an extremely low pressurization force. Consequently the noise resistance is also improved. Hereby, the preload given to the piezoelectric type load cell 17 surely decreases without influence from the bearing 7. Then, the accurate decrease of the preload can be measured.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE PREFERRED EMBODIMENTS

The drive unit of a drive apparatus according to the present invention is applied to a pressure device, such as a spot welding gun, FSW, and a press, and a C type welding gun will be illustrated as an example.

In the following, embodiments shown in the attached drawings will be described.

Figure 1:
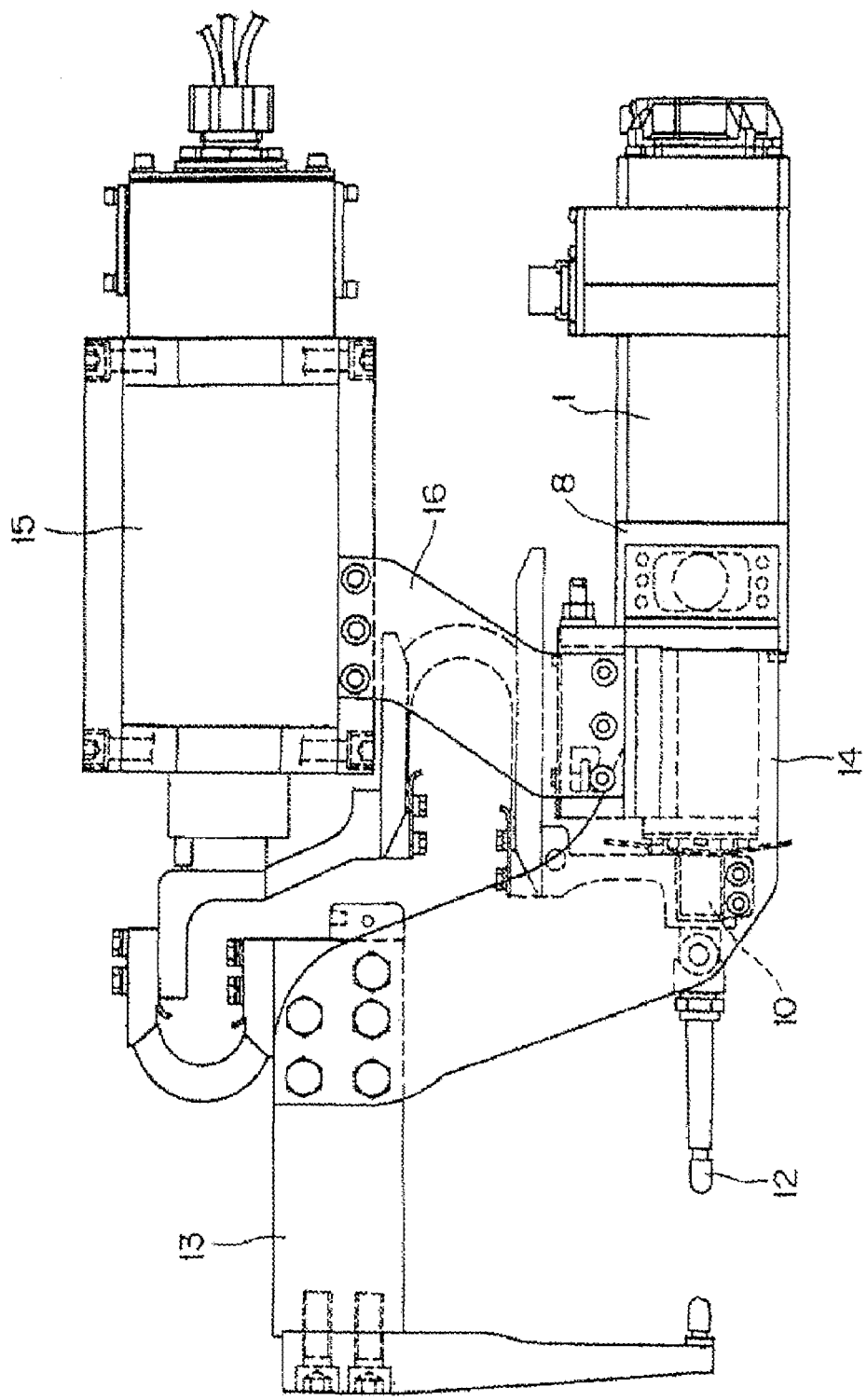
FIG. 1 is a schematic side view of a welding gun provided with a drive unit according to the present invention.
Figure 2:
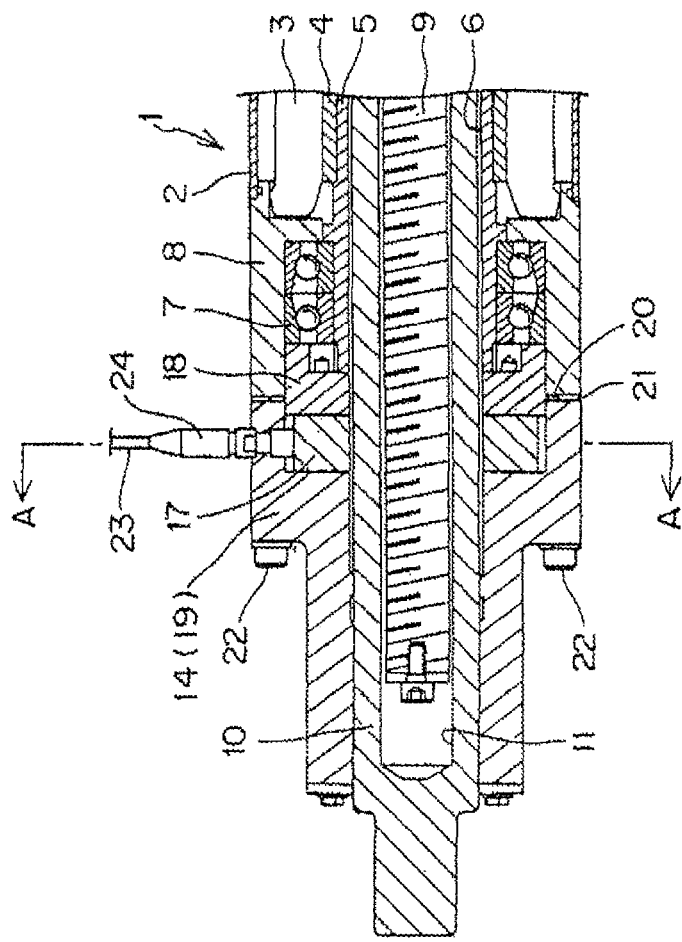
FIG. 2 is a sectional view of the principal part of the drive unit according to the present invention.
Figure 3:
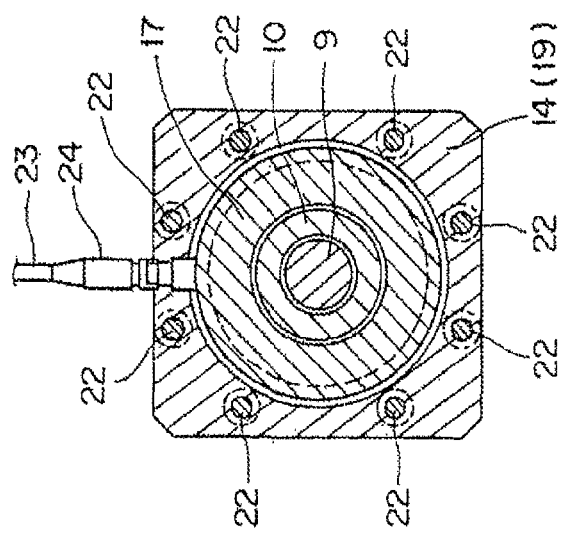
FIG. 3 is a sectional view taken along a line A-A in FIG. 2.

FIG. 1 shows the whole body of a welding machine using a drive unit according to the present invention, and FIGS. 2 and 3 show the drive unit of a pressure device according to the present invention.

In the welding machine using the drive unit according to the present invention, a servo motor 1, which is a drive source, and a welding transformer 15 are integrally coupled to each other with a supporting member 16. Furthermore, an electrode 12 movable by the drive unit, including the servo motor 1, extends to the other electrode, which is situated at an end and faces to a horizontal direction, through a fixed arm 13. In addition, 10 denotes a pressure shaft; 12 denotes one electrode projected and hidden from a pressure shaft 10 in the horizontal direction to become nearer or farther from the other electrode; and 14 denotes a guide for coupling the drive unit and the fixed arm 13.

FIGS. 2 and 3 show the drive unit of the pressure device.

The servo motor 1 is provided with a stator winding 3, fixed to an outer shell 2, a rotor magnetic pole 4, arranged on the inner circumference of the stator winding 3, and a rotary shaft 5, on which the rotor magnetic pole 4 is fixed. Then, a through-hole 6 is formed in the rotary shaft 5, and the rotary shaft 5 is supported by a bearing 7 rotatably in a front lid 8 of the servo motor 1.

Furthermore, a ball screw shaft 9 is fixed to the rotary shaft 5 and positioned inside the rotary shaft 5, and a pressure shaft 10 is fixed to a ball nut (not shown) threaded with the said ball screw shaft 9 by way of balls (not shown).

A member for fixing the bearing 7 serves also as a preload striker plate 18 of a piezoelectric type load cell 17, which is formed in a ring and is arranged in order that the pressure shaft 10 passes through the central portion of the load cell 17. Furthermore, a preload setting striker plate 19, serving also as a guide 14 for the pressure shaft 10, through which striker plate 19 the pressure shaft 10 passes, is arranged on the opposite side of the preload striker plate 18 with the piezoelectric type load cell 17 put between them.

A gap 21 between the preload setting striker plate 19, applying a preload to the piezoelectric type load cell 17, and the front lid 8 of the servo motor 1 is closed by an O ring 20. Consequently, the piezoelectric type load cell 17 is sandwiched between the preload striker plate 18 and the preload setting striker plate 19. Furthermore, bolts 22 can exert a preload to the piezoelectric type load cell 17 by tightening the preload setting striker plate 19 to the front lid 8. In addition, 23 denotes a communication cable for transmitting a signal from the piezoelectric type load cell 17 to an applying pressure control apparatus, and 24 is a connector between the piezoelectric type load cell 17 and the communication cable 23.

In the structure described above, the rotation of the rotary shaft 5 caused by the driving of the servo motor 1 projects the pressure shaft 10 through the ball screw shaft 9 and the ball nut (not shown), and a pressurization force is produced in the pressure shaft 10. At that time, the reaction force of the pressurization force operates to decrease the preload of the piezoelectric type load cell 17 through the bearing 7. Now, because the piezoelectric type load cell 17 generates a voltage proportioned to the amount of a change for a decrease of the preload, the generated voltage is used as the numerical value of the generated pressurization as an output voltage, and the signal is led to the applying pressure control apparatus through the communication cable 23.

Consequently, the set preload of the piezoelectric type load cell 17 can be raised to the limit of the capacity of the load cell, and furthermore the possibility of damaging the load cell 17 is little even if the pressurization force is abnormally great. Furthermore, because the piezoelectric type load cell 17 is situated before the bearing 7 and between the bearing 7 and the preload setting striker plate 19, the attachment and the removal of the load cell 17 can simply be done, and the connection of the communication cable 23, attached to the piezoelectric type load cell 17, can also be performed very easily.

Figure 4:
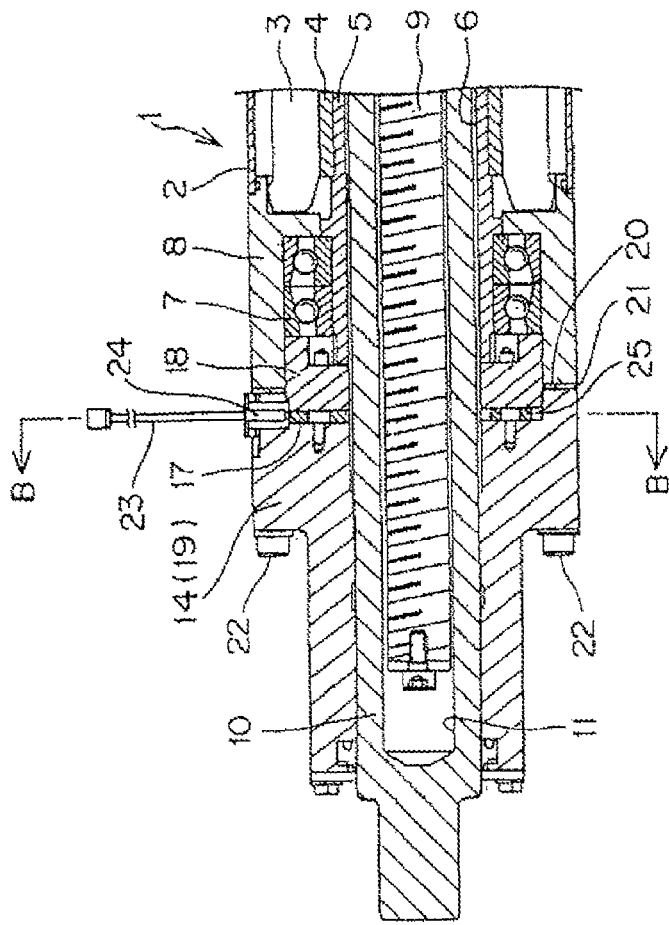
FIG. 4 is a sectional view of the principal part of another embodiment of the drive unit according to the present invention.
Figure 5:
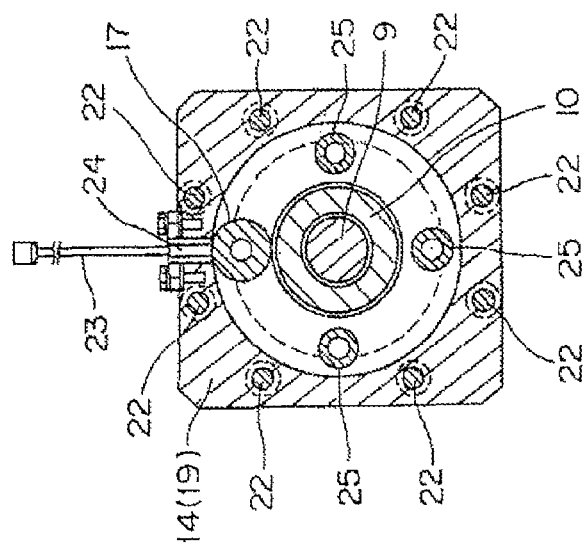
FIG. 5 is a sectional view taken along a line B-B in FIG. 4.

FIGS. 4 and 5 show another embodiment of the present invention.

In FIGS. 4 and 5, the piezoelectric type load cell 17 is arranged on the periphery of the center of the pressure shaft 10 in conjunction with a plurality of spacers 25 to be sandwiched between the preload striker plate 18 and the preload setting striker plate 19, and the piezoelectric type load cell 17 is incorporated with a preload exerted thereon with the bolts 22. Because the other configuration of the embodiment is substantially same as that of the embodiment described above, the substantially same parts of the configuration are denoted by the same marks as those of the former embodiment. Their descriptions are omitted.

If the piezoelectric type load cell 17 is arranged on the periphery of the center of the pressure shaft 10 to form a polygon in conjunction with the plurality of spacers 25, the piezoelectric type load cell 17 can freely be selected to be small in size especially independent of the diameter of the pressure shaft 10, which freedom of the selection makes the cost inexpensive, in addition to the operation and effects of the former embodiment.

Following is still another embodiment of the present invention.

Figure 6:
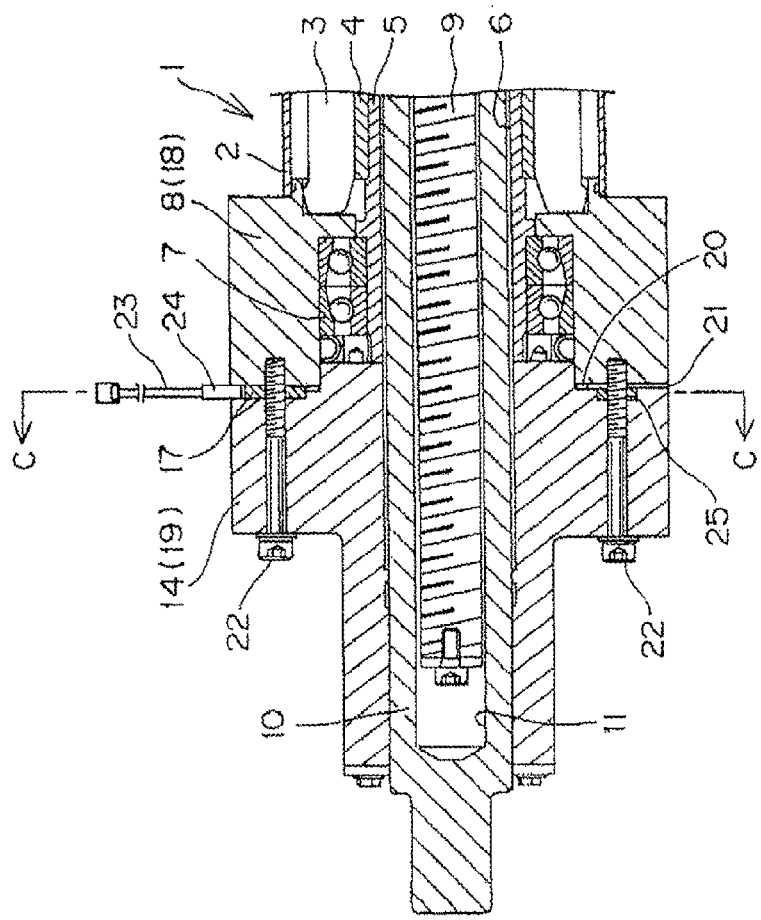
FIG. 6 is a sectional view of the principal part of still another embodiment of the drive unit according to the present invention.
Figure 7:
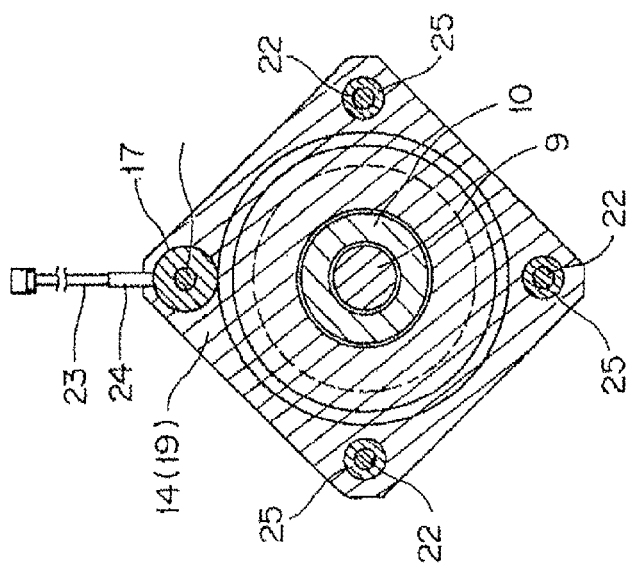
FIG. 7 is a sectional view taken along a line C-C in FIG. 6.

In FIGS. 1, 6 and 7, a fixed arm 13 is attached to the side of the preload setting striker plate 19, and the piezoelectric type load cell 17 is sandwiched between the preload setting striker plate 19 (14) and the preload striker plate 18, to incorporate the piezoelectric type load cell 17 with a preload exerted.

Because the other parts of the configuration are substantially same as those of the preceding other embodiment, the same parts are dented by the same marks as those of the preceding embodiment, and their descriptions are omitted.

In the present embodiment, a force separating the preload setting striker plate 19 from the piezoelectric type load cell 17 is exerted when a pressurization force is produced in the pressure shaft 10, in addition to the operation and the effect of the preceding other embodiment. Thereby the loss of the frictional force at the time of pressurization takes the minimum value, and it becomes possible to obtain a signal having a large S/N ratio to an extremely low pressurization force. Consequently, the noise resistance is also improved. Hereby, the preload given to the piezoelectric type load cell 17 surely decreases without influence from the bearing 7. Then, the accurate decrease of the preload can be measured.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A drive unit used for a pressure device, such as a spot welding gun, FSW, and a press, comprising:
   a rotary shaft of a drive source formed of a hollow shaft;
   a preload striker plate and a preload setting striker plate, provided in front of a bearing of the rotary shaft; and
   a piezoelectric type load cell, sandwiched between the preload striker plate and the preload setting striker plate with a preload exerted on the load cell by both the striker plates.

2. The drive unit of a pressure device according to claim 1, wherein the piezoelectric type load cell is arranged on a periphery of a shaft center in conjunction with a plurality of spacers to be sandwiched between the preload striker plate and the preload setting striker plate to be incorporated with the preload exerted thereon.

3. The drive unit of a pressure device according to claim 1 or 2, wherein the pressure device is fastened to an outer fixed structure through the preload setting striker plate.

* * * * *